(12) United States Patent
Patel et al.

(10) Patent No.: US 7,853,279 B2
(45) Date of Patent: Dec. 14, 2010

(54) ADVANCED FEATURES ON A REAL-TIME EXCHANGE SYSTEM

(75) Inventors: Krishnakant M. Patel, Richardson, TX (US); Giridhar K. Boray, Plano, TX (US); Ravi Ayyasamy, Richardson, TX (US); Gorachand Kundu, Bangalore (IN)

(73) Assignee: Kodiak Networks, Inc., San Ramon, CA (US)

( * ) Notice: Subject to any disclaimer, the term of this patent is extended or adjusted under 35 U.S.C. 154(b) by 678 days.

(21) Appl. No.: 11/740,805

(22) Filed: Apr. 26, 2007

(65) Prior Publication Data

US 2007/0253347 A1    Nov. 1, 2007

Related U.S. Application Data

(60) Provisional application No. 60/795,090, filed on Apr. 26, 2006.

(51) Int. Cl.
*H04M 3/42*    (2006.01)
*H04B 7/00*    (2006.01)
*H04B 3/00*    (2006.01)

(52) U.S. Cl. .................... 455/518; 455/414.1; 455/416; 455/519

(58) Field of Classification Search ................. 455/517, 455/518, 519, 416, 431, 414.1; 370/259, 370/278

See application file for complete search history.

(56) References Cited

U.S. PATENT DOCUMENTS

| 5,711,011 A | 1/1998 | Urs et al. |
|---|---|---|
| 5,987,318 A | 11/1999 | Alperovich et al. |
| 6,021,326 A | 2/2000 | Nguyen |
| 6,138,011 A | 10/2000 | Sanders, III et al. |
| 6,304,558 B1 | 10/2001 | Mysore |
| 6,411,815 B1 | 6/2002 | Balasuriya |
| 6,477,366 B1 | 11/2002 | Valentine et al. |
| 6,661,878 B1 | 12/2003 | Mirashrafi et al. |
| 7,043,266 B2* | 5/2006 | Chaturvedi et al. ......... 455/519 |
| 7,170,863 B1* | 1/2007 | Denman et al. ............. 370/260 |
| 7,529,557 B2* | 5/2009 | Farrill ........................ 455/518 |
| 2001/0005372 A1 | 6/2001 | Cave et al. |
| 2002/0196781 A1 | 12/2002 | Salovuori |
| 2003/0016632 A1 | 1/2003 | Refai et al. |

(Continued)

FOREIGN PATENT DOCUMENTS

WO    00/79825    12/2000

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.

SKYPE: "Skype". Web Archive—SKYPE, May 22, 2004, pp. 1-2. XP002345780 http://web.archive.org/web20040522201727 http://web.skype.com.

(Continued)

*Primary Examiner*—Tilahun Gesesse
(74) *Attorney, Agent, or Firm*—Gates & Cooper LLP

(57) ABSTRACT

A real-time exchange (RTX) interfaces to a wireless communications system to provide enhanced features for advanced voice services (AVS), which include Voice Activated Floor Management, Voice Short Message Services (SMS) and Address Book Backup.

8 Claims, 5 Drawing Sheets

U.S. PATENT DOCUMENTS

| | | |
|---|---|---|
| 2003/0078064 A1 | 4/2003 | Chan |
| 2003/0190888 A1* | 10/2003 | Mangal et al. ............. 455/3.05 |
| 2004/0057449 A1 | 3/2004 | Black |
| 2004/0259580 A1 | 12/2004 | Florkey et al. |
| 2005/0189337 A1* | 9/2005 | Baune .................. 219/145.23 |
| 2005/0202807 A1 | 9/2005 | Ayyasamy et al. |
| 2005/0221819 A1 | 10/2005 | Patel et al. |
| 2005/0239485 A1 | 10/2005 | Kundu et al. |
| 2005/0254464 A1 | 11/2005 | Patel et al. |
| 2005/0261016 A1* | 11/2005 | Patel et al. .................. 455/518 |
| 2006/0019654 A1* | 1/2006 | Farrill ..................... 455/426.1 |
| 2006/0030347 A1* | 2/2006 | Biswaas .................... 455/518 |
| 2006/0078064 A1* | 4/2006 | Schmidt et al. ............. 375/296 |
| 2006/0189337 A1 | 8/2006 | Farrill et al. |
| 2006/0234687 A1* | 10/2006 | Patel et al. ............... 455/414.2 |
| 2007/0037597 A1* | 2/2007 | Biswas et al. ............... 455/518 |
| 2007/0037598 A1 | 2/2007 | Ayyasamy et al. |
| 2007/0217591 A1* | 9/2007 | Yasuma ................. 379/202.01 |

FOREIGN PATENT DOCUMENTS

| | | |
|---|---|---|
| WO | 03/101007 | 12/2003 |
| WO | 2005/009006 | 1/2005 |
| WO | 2005/112494 | 11/2005 |
| WO | 2005/115032 | 12/2005 |
| WO | 2005/117474 | 12/2005 |
| WO | 2006/105287 | 10/2006 |

OTHER PUBLICATIONS

Trachwell: "TrackWell Software and Tetra Iceland deliver value added services to Tetra users", trackwell.com, Oct. 2002, pp. 1-1. XP002345781 http://www.trackwell.com/news/news_twandtetra.htm.

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

* cited by examiner

ADVANCED FEATURES ON A REAL-TIME EXCHANGE SYSTEM

CROSS REFERENCE TO RELATED APPLICATIONS

This application claims the benefit under 35 U.S.C. Section 119(e) of the following co-pending and commonly-assigned U.S. provisional patent application:

U.S. Provisional Patent Application Ser. No. 60/795,090, filed on Apr. 26, 2006, by Krishnakant M. Patel, Giridhar K. Boray, Ravi Ayyasamy, and Gorachand Kundu, entitled "ADVANCED FEATURES ON A REAL-TIME EXCHANGE SYSTEM,"

which application is incorporated by reference herein.

This application is related to the following co-pending and commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK,", which application claims the benefit under 35 U.S.C. Section 365 of P.C.T. International Patent Application Serial Number PCT/US03/16386, which application claims the benefit under 35 U.S.C. Section 119(e) of U.S. Provisional Patent Application Ser. Nos. 60/382,981, 60/383,179 and 60/407,168;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Patent Application Serial Number PCT/US04/23038, which application claims the benefit under 35 U.S.C. Section 119(e) of U.S. Provisional Patent Application Ser. Nos. 60/488,638, 60/492,650 and 60/576,094 and which application is a continuation-in-part and claims the benefit under 35 U.S.C. Sections 119, 120 and/or 365 of P.C.T. International Patent Application Serial Number PCT/US03/16386;

U.S. patent application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS MS 120 AND NETWORKS," 154.9-US-U1, which application claims the benefit under 35 U.S.C. Section 119(e) of U.S. Provisional Patent Application Ser. Nos. 60/569,953 and 60/579,309, and which application is a continuation-in-part and claims the benefit under 35 U.S.C. Sections 119, 120 and/or 365 of U.S. Utility patent application Ser. No. 10/515,556 and P.C.T. International Patent Application Serial Number PCT/US04/23038;

U.S. Utility patent application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," which application claims the benefit under 35 U.S.C. Section 119(e) of U.S. Provisional Patent Application Ser. No. 60/571,075, and which application is a continuation-in-part and claims the benefit under 35 U.S.C. Sections 119, 120 and/or 365 of U.S. Utility patent application Ser. No. 10/515,556 and P.C.T. International Patent Application Serial Number PCT/US04/23038;

U.S. Utility patent application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," which application claims the benefit under 35 U.S.C. Section 119(e) of U.S. Provisional Patent Application Ser. Nos. 60/573,059 and 60/576,092, and which application is a continuation-in-part and claims the benefit under 35 U.S.C. Sections 119, 120 and/or 365 of U.S. Utility patent application Ser. No. 10/515,556, P.C.T. International Patent Application Serial Number PCT/US04/23038, U.S. Utility patent application Ser. No. 11/126,587, and U.S. Utility patent application Ser. No. 11/129,268;

U.S. Utility patent application Ser. No. 11/136,233, filed May 24, 2005, by Krishnakant M. Patel, Vyankatesh Vasant Shanbhag, and Anand Narayanan, entitled "SUBSCRIBER INFORMATION MODULE (SIM) ENABLING ADVANCED VOICE SERVICES (AVS) INCLUDING PUSH TO TALK ON WIRELESS MS 120 AND NETWORKS,", which application claims the benefit under 35 U.S.C. Section 119(e) of U.S. Provisional Patent Application Ser. No. 60/573,780, and which application is a continuation-in-part and claims the benefit under 35 U.S.C. Sections 119, 120 and/or 365 of U.S. Utility patent application Ser. No. 10/515,556, P.C.T. International Patent Application Serial Number PCT/US04/23038, U.S. Utility patent application Ser. No. 11/126,587, and U.S. Utility patent application Ser. No. 11/134,883 ;

U.S. Utility patent application Ser. No. 11/158,527, filed Jun. 22, 2005, by F. Craig Farrill, entitled "PRESS-TO-CONNECT FOR WIRELESS COMMUNICATIONS SYSTEMS,", which application claims the benefit under 35 U.S.C. Section 119(e) of U.S. Provisional Patent Application Ser. No. 60/581,954, and which application is a continuation-in-part and claims the benefit under 35 U.S.C. Sections 119, 120 and/or 365 of U.S. Utility patent application Ser. No. 10/515,556 and P.C.T. International Patent Application Serial Number PCT/US04/23038;

U.S. Utility patent application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Patent Application Ser. No. 60/588,464;

U.S. Utility patent application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS,", which application claims the benefit under 35 U.S.C. Section 119(e) of U.S. Provisional Patent Application Ser. No. 60/654,271;

P.C.T. International Patent Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE,", which application claims the benefit under 35 U.S.C. Section 119(e) of U.S. Provisional Patent Application Ser. No. 60/666,424;

U.S. Utility patent application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NET- WORKS," which application claims the benefit under 35 U.S.C. Section 119(e) of U.S. Provisional Patent Application Ser. No. 60/705,115;

U.S. Utility patent application Ser. No. 11/463,186, filed Aug. 8, 2006, by Ravi Ayyasamy and Krishnakant M. Patel, entitled "ADVANCED VOICE SERVICES CLIENT FOR BREW PLATFORM,", which application claims the benefit under 35 U.S.C. Section 119(e) of U.S. Provisional Patent Application Ser. No. 60/706,265;

U.S. Utility patent application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS,", which application claims the benefit under 35 U.S.C. Section 119(e) of U.S. Provisional Patent Application Ser. No. 60/795,090;

all of which applications are incorporated by reference herein.

BACKGROUND OF THE INVENTION

1. Field of the Invention

This invention relates in general to wireless communications systems, and more specifically, to enhanced features for advanced voice services wireless communications systems.

2. Description of Related Art

Advanced voice services (AVS), such as two-way half-duplex voice calls within a group, also known as Push-to-Talk (PTT) or Press-to-Talk (P2T), as well as other AVS functions, such as Push-to-Conference (P2C) or Instant Conferencing, Upgrade to Conference, Push-to-Message (P2M), etc., are described in the co-pending and commonly-assigned patent applications cross-referenced above and incorporated by reference herein. These AVS functions have enormous revenue earnings potential for wireless communications systems, such as cellular networks and personal communications systems (PCS) networks.

Currently, there are three major approaches employed in providing advanced voice services in wireless communications systems. One approach requires the installation of a dedicated private network, parallel to the wireless communications system, to support the group-based voice services. NEXTEL uses such a system, based on a solution developed by MOTOROLA known as IDEN. However, a dedicated private network is costly to install and maintain and is employed by a few public wireless carriers. Also, the IDEN system is non-standard, and hence cannot be used in standard wireless communications networks, such as those based on GSM (Global System for Mobile Communications) and CDMA (Code Division Multiple Access).

Another approach is based on Voice over IP (VoIP) technologies. While this approach promises compliance with newer and emerging standards, such as GPRS (General Packet Radio Service), UMTS (Universal Mobile Telecommunications System), etc., it does not provide a solution for carriers employing wireless communications systems based on existing standards, such as GSM, CDMA, etc. However, even for the newer standards, solutions based on VoIP have serious drawbacks, including slower call setup, significant overhead, increased susceptibility to packet losses, low bit rate voice coders, and significant modifications to the mobile handset. There is a need, instead, for solutions that require only minimal upgrades to the handset.

Still another approach is that defined in the co-pending and commonly-assigned patent applications cross-referenced above and incorporated by reference herein. In this approach, advanced voice services are provided by a dispatch gateway (DG) or real-time exchange (RTX) that interfaces to the wireless communications system to provide the advanced voice services therein, wherein both the dispatch gateway and mobiles that use the advanced voice services communicate with each other using call setup and in-band signaling within the wireless communications system.

Notwithstanding these innovations, there is a need in the art for other advanced voice services that comply with existing and emerging wireless standards and provide superior user experiences. The present invention aims to satisfy this need by providing enhanced features in advanced voice services for wireless communications systems.

SUMMARY OF THE INVENTION

To overcome the limitations in the prior art described above, and to overcome other limitations that will become apparent upon reading and understanding the present specification, the present invention discloses enhanced features for advanced voice services for wireless communications systems. A real-time exchange (RTX) interfaces to the wireless communications system to provide these enhanced features for the advanced voice services, which include Voice Activated Floor Management, Voice Short Message Services (SMS) and Address Book Backup.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention describes a wireless communications network that is used for making calls to and from mobile units, wherein the calls are initiated by call setup and in-band signaling within the wireless communications network and voice frames for the calls are switched between the mobile units across bearer paths in the wireless communications network. A real-time exchange interfaces to the wireless communications network to provide an advanced features for use with advanced voice service (AVS) for the wireless communications network. Specifically, the advanced features for AVS comprises Voice Activated Floor Management, Voice Short Message Services (SMS) and Address Book Backup.

Network Architecture

Figure 1:
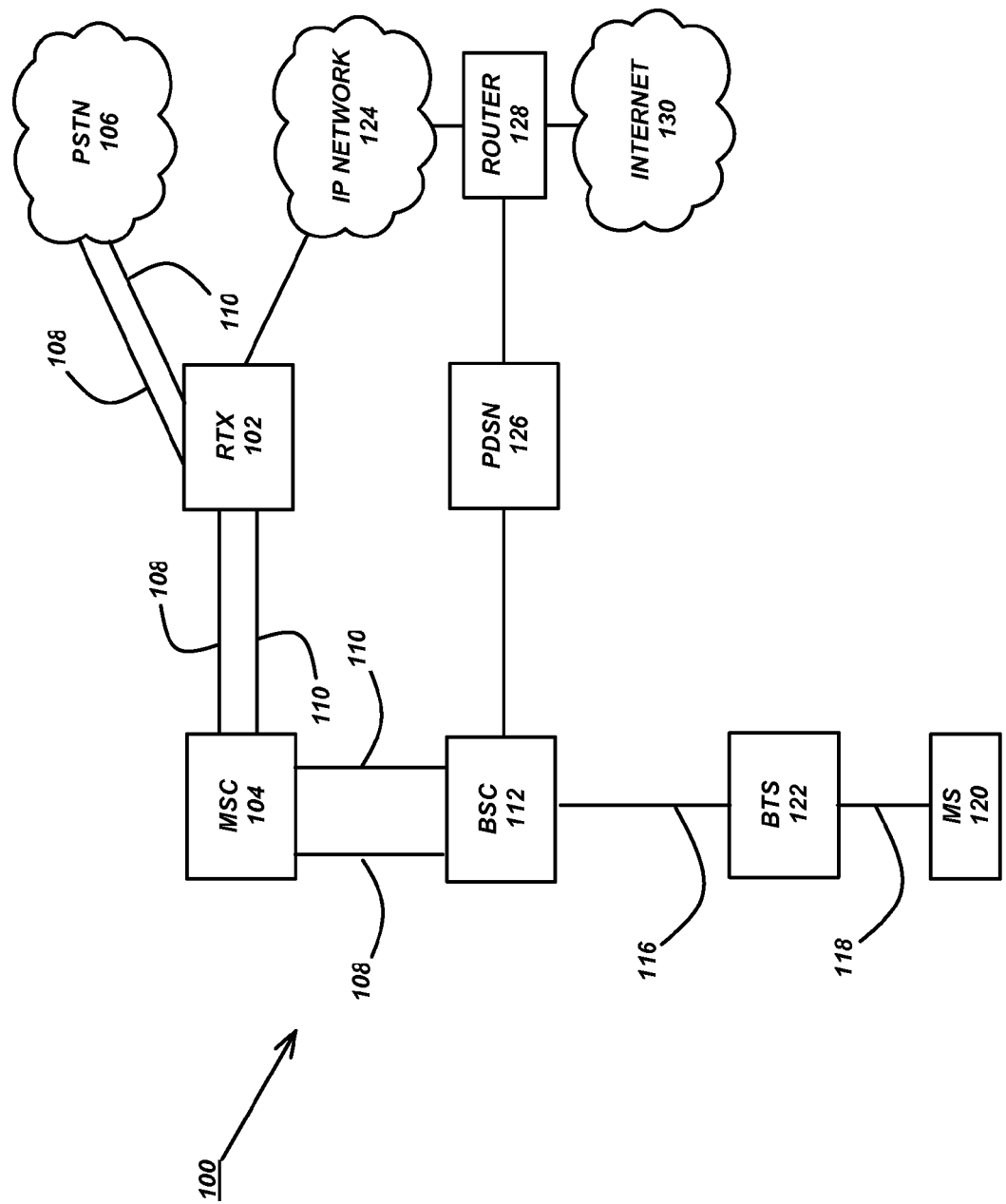
FIG. 1 is a block diagram that illustrates an exemplary embodiment of the dispatch services architecture framework according to a preferred embodiment of the present invention.

FIG. 1 is a block diagram that illustrates an exemplary embodiment of a wireless communications network 100 according to a preferred embodiment of the present invention for making calls to and from mobile units.

Within the network 100, an RTX (Real-Time Exchange) 102, previously known as a Dispatch Gateway (DG), communicates with a MSC (Mobile Switching Center) 104 and PSTN (Public Switched Telephone Network) 106 using SS7—ISUP/WIN/CAMEL (Signaling System 7—Integrated Services Digital Network User Part/Wireless Intelligent Network/Customized Applications for Mobile Enhanced Logic) messages at a signaling plane 108.

A bearer path 110 implements a TDM (Time Division Multiplexing) interface carrying PCM (Pulse Code Modulation) or TFO (Tandem Free Operation) voice frames. Support for TFO in this path 110 is negotiated between a BSC (Base Station Controller) 112 and the RTX 102 for each originating and terminating leg of an AVS call. The use of TFO ensures high voice quality (as voice vocoder conversion is avoided) between mobile-to-mobile calls.

When a subscriber originates an AVS call, the MSC 104 routes the call to the RTX 102. The MSC 104 also requests the BSC 112 via 116 to establish a radio traffic path 118 with a mobile station (MS) 120 (also known as a handset or mobile unit) via the BTS (Base Transceiver Station) 122 (as it does for a normal cellular call). At this time, the BSC 112 tries to negotiate TFO (if it is supported) on a TDM link with the far end (in this case, the RTX 102).

At the same time (after the MSC 104 terminates the group call request to the RTX 102), the RTX 102 identifies the terminating group users and their MS-ISDN (Mobile Station—Integrated Services Digital Network) numbers. It sends an ISUP call origination request for each terminating MS 120. It may send requests directly to the MSC 104, PSTN 106 or IP network 124 via a PDSN (Public Data Switched Network) 126, Router 128, and/or Internet/Intranet 130, depending on the routing table configuration for terminating MS-ISDN numbers.

Once the bearer path 110 is established, the RTX 102 begins a negotiation with the far end (in this case, the terminating BSC 112) for each terminating leg to an MS 120.

Once bearer paths 110 are established for originating and terminating legs for an AVS call, the RTX 102 switches (or duplicates) voice frames from the originating MS 120 to all terminating MS's 120.

The RTX 102 may use an IP network 124 or the Internet/Intranet 130 for two different purposes. The IP network 124 or the Internet/Intranet 130 can be used in a toll bypass mode where two RTXs 102 can exchange voice traffic bypassing the PSTN 106. However, each RTX 102 is responsible for terminating traffic to its closest MSC 104. In this case, the IP network 124 or the Internet/Intranet 130 is used as a backbone transport of voice traffic between two RTXs 102.

The IP network 124 or the Internet/Intranet 130 can also be used for a registration and presence application. Since the MSC 104 will not direct a registration request from an MS 120 to the RTX 102 (because it would require changes in the MSC 104), the latter does not have any information of the registered MS 120. To circumvent this issue, a registration and presence application runs over an IP stack in the MS 120. After the MS 120 registers for a data interface (i.e., obtaining an IP address) with the PDSN 126 (or Serving GSM Service Nodes (SGSN) in the case of GSM networks), the registration and presence application in the MS 120 registers with the RTX 102 using its IP address. The RTX 102 also uses this IP interface to update the presence information of other group members to an MS 120.

An alternative embodiment would use the SMS (Short Message Service) transport to carry presence messages over a data channel. The RTX 102 interacts with the MS 120 using predefined presence application related messages that are transported as SMS messages. The same messages can be transported via the PDSN 126 interface, if group users have data service.

Real Time Exchange

Figure 2:
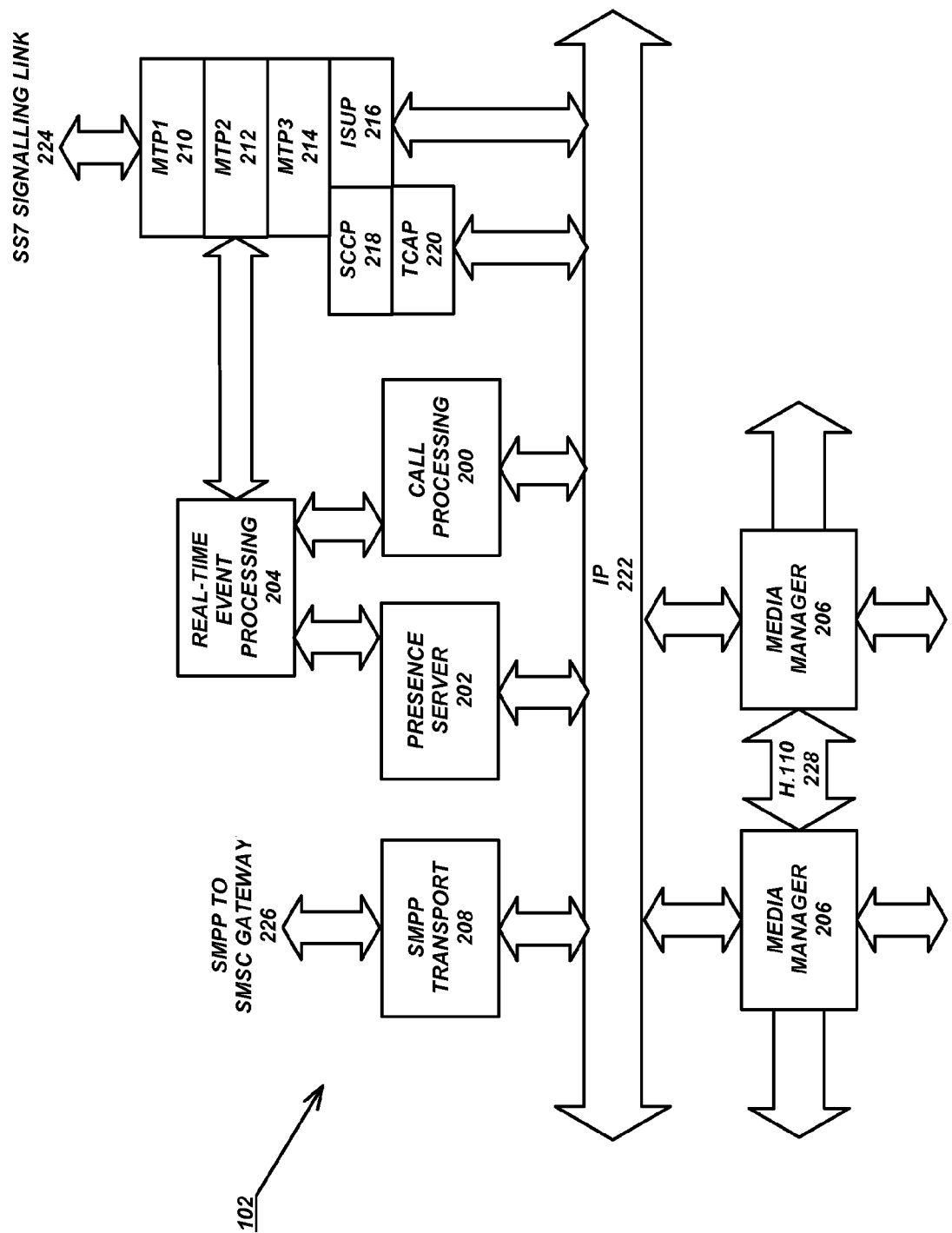
FIG. 2 is a block diagram that illustrates the architecture of the real-time exchange according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) gateway using the SMPP protocol 226. The Media Managers 204 communicate among themselves using the H. 110 protocol 228 (or some other protocol, such TCP/IP).

The operation of these various components are described in more detail below, as well as in the co-pending and commonly-assigned patent applications cross-referenced above and incorporated by reference herein.

The originating MS 120 signals the RTX 102 via the wireless network 100, e.g., by transmitting one or more configured DTMF (Dual Tone Multi Frequency) digits or other signals to the RTX 102. The Media Manager systems 206 receive the DTMF digits or other signals, and pass the DTMF digits or other signals to the Call Processing system 200. The Call Processing (CP) system 200 determines whether the originating MS 120 has subscribed to the AVS feature before originating the AVS session. Upon confirmation, the Call Processing system 200 initiates a new AVS session. The Call Processing system 200 interacts with the Presence Server 202 and Real-Time Event Processing system 204 to cause the wireless network 100 to perform session setup for the AVS session, and thereafter to manage the AVS session.

During the AVS session, for example, the Call Processing system 200 interacts with the Media Manager systems 206 to maintain the H.110 channels 227 and assign any additional H.110 channels 228 required for the AVS session, which may span across multiple Media Manager systems 206. Moreover, the Media Manager systems 206 of the RTX 102 may be used, for example, to mix audio streams between the originating MS 120 and the terminating MS 120, and then deliver these mixed audio streams to the originating MS 120 and the terminating MS 120. The H.110 channels 228 are used for passing mixed and unmixed audio streams voice between the Media Manager systems 200 as required.

Voice Portal Integration

In one embodiment, the enhanced features comprise voice recognition services for enhancing the calls to and from the MS 120. These features are provided using a voice portal. Voice portals provide telephone users with a natural language interface to access and retrieve network 100 services. Typically, voice portals are based on speaker-independent speech recognition technologies. Hence, this solution also applies equally well to AVS-enabled handsets and non-AVS-enabled handsets, including landline phones.

For example, voice portals have been extensively used for 1-800 directory enquiry, flight information, etc., and have matured over the years with improved speech recognition accuracy. In addition, the advent of standard voice scripting language, such as VoiceXML, has fueled growth of voice portal services just as HTML did for web services.

Additional information concerning voice portals can be found in U.S. Utility patent application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS,", which application claims the benefit under 35 U.S.C. Section 119(e) of U.S. Provisional Patent Application Ser. No. 60/654,271, which applications are incorporated by reference herein.

Figure 3:
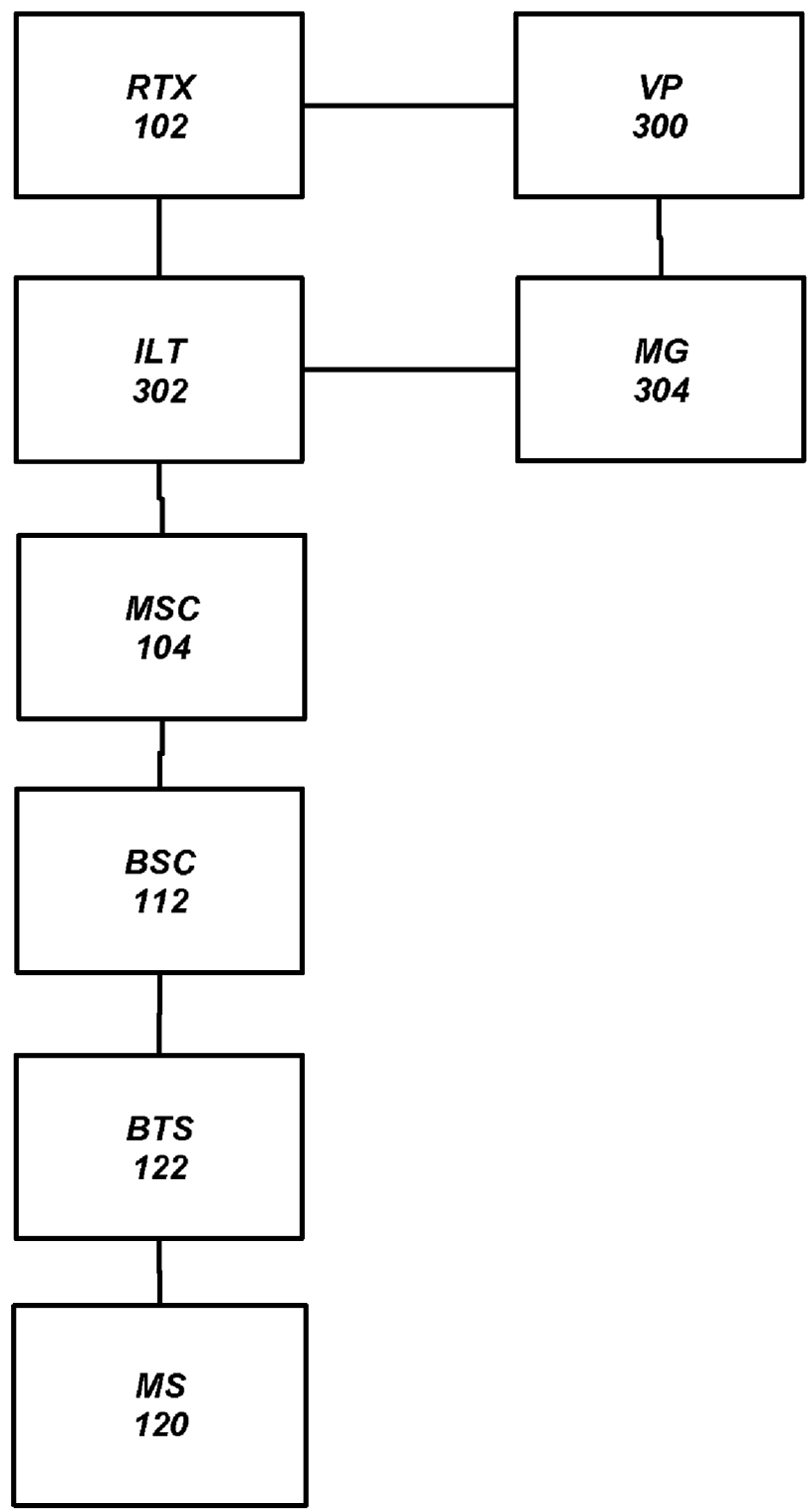
FIG. 3 illustrates the architecture used by the present invention in leveraging the underlying voice recognition systems of a wireless communications network.

FIG. 3 illustrates the architecture used by the present invention in leveraging the underlying voice recognition systems of a wireless communications network 100. In this embodiment, the RTX 102 interfaces to one or more Voice Portals (VPs) 300, as well as an Integrated Local and Transit (ILT) switch 302. The ILT 302 also interfaces to the VP 400 via a Media Gateway (MG) 404. In addition, the RTX 102 interfaces to the MSC 104 through the ILT 402 (or interfaces directly to the MSC 104 as shown in FIG. 1) to control call signaling, as well as voice frame buffering and duplication.

The integration of the RTX 102 with a standard VP 300 opens up unlimited possibilities to expand the reach of AVS. Moreover, the integration of the RTX 102 with the VP 300 eliminates the need for a client in the MS 120.

Consider the example where the voice recognition services are used to invoke PTT services within a group of MS 120 identified in the RTX 102. The typical scenario comprises the following:

the user dials a pre-determined code on the MS 120 to access the VP 300, the MS 120 receives a confirmation tone from the VP 300, the user inputs a voice command on the MS 120 (for example, by saying "call friends") to invoke a PTT call with a group identified as "friends" in the RTX 102, the VP 300 performs speech recognition and sends the decoded message to the RTX 102, and the RTX 102 places the PTT call to the chosen group.

Voice Activated Floor Management

In the present invention, the RTX 102 interfaces to the wireless communications network 100 to provide a half-duplex Push-to-Talk (PTT) session between an initiator and two or more other participants, wherein both the TX 102 and MS 120 participating in the PTT session communicate with each other using call setup and in-band signaling within the wireless communications network 100. The other participants comprise one or more contacts, one or more groups of contacts, or a subset of a group of contacts.

In other embodiments, for example as described in the cross-referenced applications set forth above, PTT is a command-and-control service that requires every participant in a multi-party call to have purpose-built handsets with a designated PTT button and a speaker. The PTT button aids in acquisition and release of floor in half-duplex, multi-party conversations. However, the requirement of having every user with special purpose handsets severely restricts the reach of this service, and thus there is a need for a solution that would apply to all terminal devices.

The present invention provides a solution for PTT floor management based on voice activity detection (VAD) in the RTX 102, with or without the voice recognition services of the VP 300. Specifically, the voice activity detection aids in acquisition and release of the floor of the PTT session, wherein the voice activity detection is based on detecting a level of voice activity from the initiator or other participants.

Floor management of the PTT session performed using voice activity detection obviates the need for purpose-built PTT handsets. In addition, the use of voice activity detection to perform floor management is also a natural way of controlling the floor.

There are a number of user benefits to this approach. For example, there is no need to purchase a purpose-built PTT handset. Moreover, there is no need to press and hold a PTT button while speaking.

There are also a number of network operator benefits to this approach. For example, the present invention expands the reach of RTX 102 enabled AVS by allowing users to experience PTT without the need of purpose-built PTT handsets. Moreover, the present invention allows PTT users from multiple networks to be part of a group call.

Figure 4:
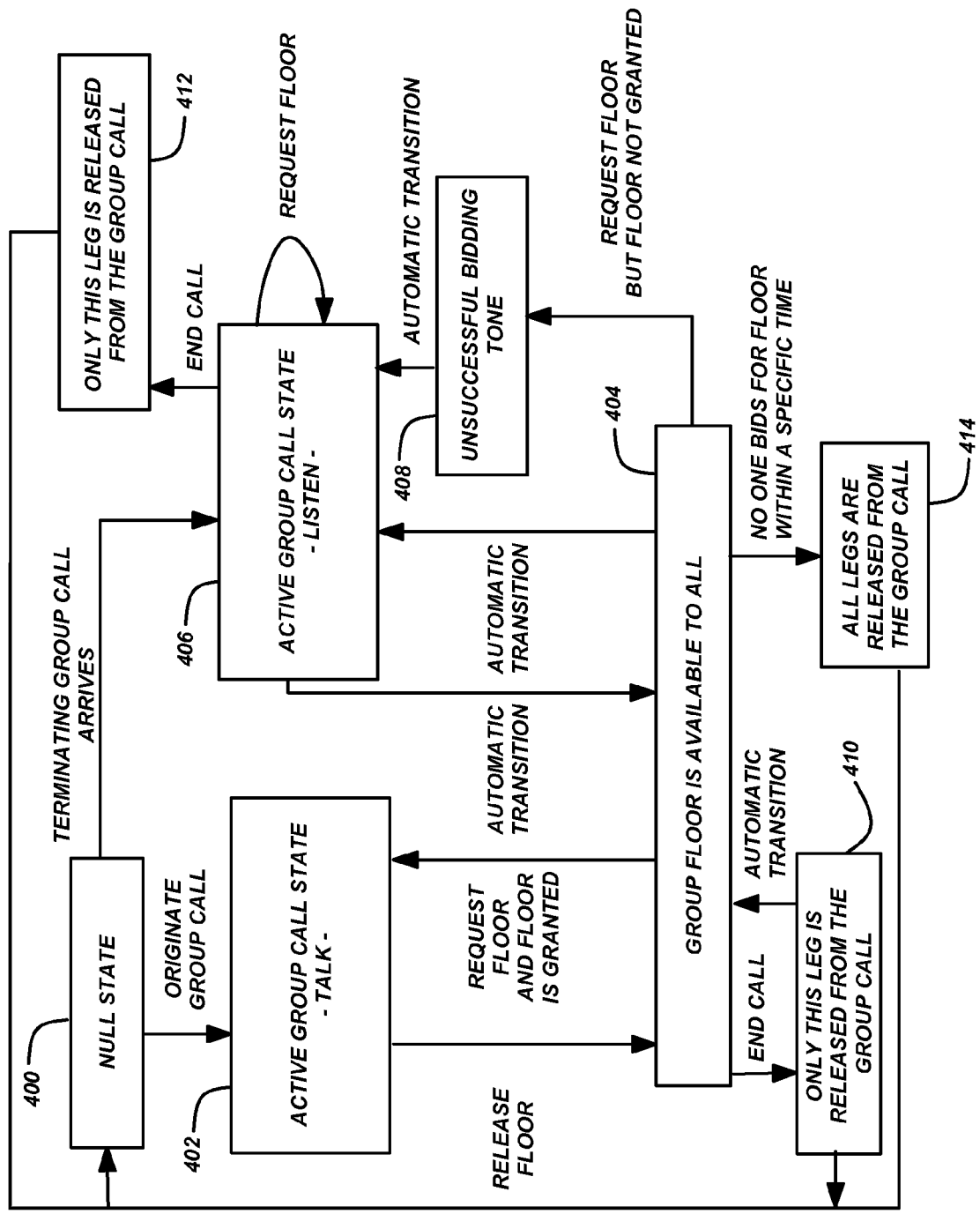
FIG. 4 is a state diagram that illustrates the operation of a Push-to-Talk (PTT) call according to a preferred embodiment of the present invention.

FIG. 4 is a state diagram that illustrates the operation of a PTT call according to a preferred embodiment of the present invention.

State 400 represents an MS 120 in a NULL state, i.e., the start of the logic. A transition out of this state is triggered by a user making a request to originate a PTT call, or by a request being made to terminate a PTT call at the MS 120. A request to originate a PTT call is normally made by pressing a PTT button, but may be initiated in this embodiment by dialing some sequence of one or more numbers on the MS 120 that are interpreted by the RTX 102, by pressing one or more other keys on the MS 120 that are interpreted by the RTX 102, by speaking one or more commands that are interpreted by the VP 400, or by some other means.

State 402 represents an MS 120 in an active group call state. In this state, the user receives a chirp tone that indicates that the user may start talking. The user responds by talking on the MS 120. The MS 120 uses the reverse traffic channel to send voice frames to the RTX 102, and the RTX 102 switches voice frames only in one direction, i.e., from talker to one or more listeners, which ensures the half-duplex operation required for a PTT call.

State 404 represents the group "floor" being available to all members of the group. When the talking user signals that the floor is released, the floor is available to all group members. The signal to release the floor is normally made by releasing the PTT button, but may be performed in this embodiment by voice activity detection, e.g., by not speaking for some time period (which is interpreted by RTX 102 as a release command). All members of the group receive a "free floor" tone on their MS 120. A user who requests the floor first (in the "free-floor" state), for example, is assigned the floor, wherein the network 100 sends a chirp tone to the successful user. The signal to request the floor is normally made by pressing the PTT button, but may be performed in this embodiment by voice activity detection, e.g., by speaking for some time period (which is interpreted by RTX 102 as a request command).

State 406 represents an MS 120 being in an active group call state. In this state, the user is listening to the group call. If a non-talking user requests the floor in the active group call state, the user does not receive any response from the network 100 and remains in the same functional state. As noted above, the signal to request the floor is normally made by pressing the PTT button, but may be performed in this embodiment by voice activity detection, e.g., by speaking for some time period (which is interpreted by RTX 102 as a request command).

State 408 represents a user receiving an "unsuccessful bidding" tone on his MS 120, after the user has requested the floor, but was not granted the floor, of the group call. The user subsequently listens to the voice message of the talking user.

Non-talking users (including the talking user who must release the floor to make it available for others) can request the network 100 to end their respective call legs explicitly.

State 410 represents a terminating leg being released from the call after the user ends the call.

State 412 also represents a terminating leg being released from the call after the user ends the call.

State 414 represents all terminating legs being released from the call when no user makes a request for the within a specified time period, or after all users have ended their respective call legs.

Voice Short Message Service (SMS)

In the present invention, the RTX 102 interfaces to the wireless communications network 100 to provide a Voice Short Message Service (SMS) message that comprises a short voice message, wherein a user sends the Voice SMS message to at least one contact, in a manner similar to sending a short text message, using their mobile unit. The Voice Short Message Service (SMS) is a value-added feature that allows a user to send short voice messages to one or more contacts, in a manner similar to the sending of short text messages, using the click of a button, on the MS 120.

In one embodiment, the user initiates a call to a Voice SMS number associated with the contact, the RTX 102 provides an indication to the user to start speaking the Voice SMS message, the RTX 102 provides for the storage of the Voice SMS message, and then the user then ends the call after completing the Voice SMS message. Thereafter, the contact receives the text SMS message on their MS 120 indicating that the Voice SMS message has been sent, the contact dials a callback number for the Voice SMS, and then the contact listens to the Voice SMS message. Finally, the RTX 102 deletes the Voice SMS message after a configured retention period or in response to a user command.

The benefits to the user of this invention are that it provides a fast and easy messaging mechanism. Moreover, it does away with the typing of messages. In addition, there is inherent multiple language support The benefits to the network operator of this invention is that it provides a new feature for a large group of users that my not be used to typing SMS messages. Moreover, the attractiveness of voice as a messaging medium enhances network usage. In addition, it grows average revenue per user (ARPU) for the operator. Finally, the invention only requires the existing network infrastructure to deploy the service.

Note that, because the information being shared is communicated by SMS, it may comprise any number of different types of data other than just voice. For example, Voice SMS messages may comprise multimedia SMS messages (e.g., audio, video, images, data, etc.).

In one embodiment, the Voice SMS feature may use the functionality of the Press-to-Message (P2M) service described in co-pending and commonly-assigned P.C.T. International Patent Application Number PCT/US04/23038, filed Jul. 16, 2004, by F. Craig Farrill, Bruce D. Lawler and Krishnakant M. Patel, entitled "PREMIUM VOICE SERVICES FOR WIRELESS COMMUNICATIONS SYSTEMS,", which application is set forth above, and incorporated by reference herein. The P2M service uses the MMS (Multi Media Services) protocol as the transport medium. The P2M service delivers multimedia messages (e.g., audio, video, images, data, etc.), known hereafter as P2M messages from an originator to one or more recipients.

Figure 5:
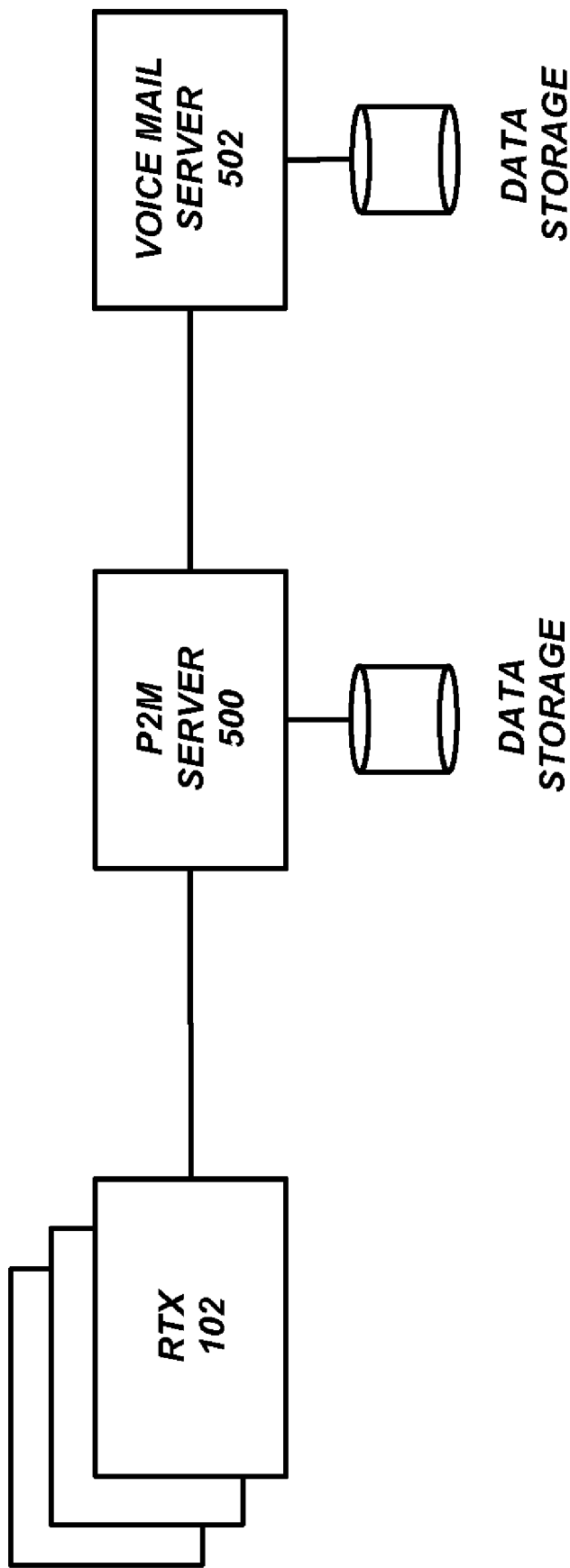
FIG. 5 illustrates a system architecture for the Voice Short Message System (SMS) service according to the preferred embodiment of the present invention.

FIG. 5 illustrates a system architecture for the Voice SMS feature according to the preferred embodiment of the present invention. The system architecture includes one or more RTXs 102 coupled to a P2M server 500, which is (optionally) coupled to a Voice Mail Server 502, wherein the RTX 102 and the P2M Server 500 work together to deliver Voice SMS messages in a non-real time manner from an originator to one or more recipients, without establishing voice paths between the originator and recipients. Recipients may comprise one or more contacts, one or more groups of contacts, or a subset of a group of contacts.

The P2M Server 500 provides a message storage facility for Voice SMS messages, or may interface to the Voice Mail Server 502 to provide a message storage facility for the Voice SMS messages. The user can store Voice SMS messages, retrieve Voice SMS messages, reply to Voice SMS messages, or forward Voice SMS messages to other subscribers. The P2M Server 500 supports the sending of Voice SMS messages to one or more contacts, one or more groups of contacts, or a subset of a group of contacts.

Address Book Backup

In the present invention, the RTX 102 interfaces to the wireless communications network 100 to perform an "over-the-air" backup of an address book stored on an MS 120 via the wireless communications network 100 for subsequent storage in a network server separate from the MS 120, wherein the network server may be the RTX 102 it self, or the P2M Server 500, or another storage system.

In one embodiment, a client application on the MS 120 detects a change to the address book stored on the MS 120 unit and automatically uploads the address book to the RTX 102. In another embodiment, a client application on the MS 120 performs a periodic backup of the address book stored on the MS 120 by uploading the address book to the RTX 102. In both embodiments, the address book is stored by the RTX 102 on the network server, which may be available to the user via Internet access, such that any changes made to the address book stored on the network server can be downloaded by the RTX 102 to the MS 120 via the wireless communications network 100.

Note that such functionality may integrated with the techniques described in U.S. Utility patent application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS,", which application claims the benefit under 35 U.S.C. Section 119(e) of U.S. Provisional Patent Application Ser. No. 60/588,464, which applications are incorporated by reference herein. Those techniques include a common data store for sharing information with members of a group, including a phone book or address book, where the entries or contact lists may be shared among group members or a master phone book can be maintained.

The present invention provides a number of user benefits, including the safeguarding of address book information against theft, loss or phone damage. Moreover, the present invention eliminates the need to manually transfer address books when the user changes phones. In addition, users can view and edit the address book online, wherein changes made online are synchronized with the MS 120.

The present invention provides a number of network operator benefits as well. For example, the present invention reassures customers by protecting valuable information, namely their address books. It also has the potential to reduce customer churn.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for providing enhanced features for advanced voice services in a wireless communications network, comprising:
   a wireless communications network for making calls to and from mobile units, wherein the calls are initiated by call setup and in-band signaling within the wireless communications network and voice frames for the calls are switched between the mobile units across bearer paths in the wireless communications network; and
   a real-time exchange that interfaces to the wireless communications network to provide a half-duplex Push-to-Talk (PTT) session between an initiator and two or more other participants, wherein both the real-time exchange and mobile units participating in the PTT session communicate with each other using call setup and in-band signaling within the wireless communications network;
   wherein floor management of the PTT session is performed by the real-time exchange using voice activity detection, such that purpose-built handsets are not required.

2. The apparatus of claim 1, wherein the voice activity detection aids in acquisition and release of the floor of the PTT session.

3. The apparatus of claim 1, wherein the voice activity detection is based on detecting a level of voice activity from the initiator or other participants.

4. The apparatus of claim 1, wherein the other participants comprise one or more contacts, one or more groups of contacts, or a subset of a group of contacts.

5. A method of providing enhanced features for advanced voice services in a wireless communications network, comprising:
   making calls to and from mobile units in a wireless communications network, wherein the calls are initiated by call setup and in-band signaling within the wireless communications network and voice frames for the calls are switched between the mobile units across bearer paths in the wireless communications network; and
   providing a half-duplex Push-to-Talk (PTT) session between an initiator and two or more other participants using a real-time exchange that interfaces to the wireless communications network, wherein both the real-time exchange and mobile units participating in the PTT session communicate with each other using call setup and in-band signaling within the wireless communications network;
   wherein floor management of the PTT session is performed by the real-time exchange using voice activity detection, such that purpose-built handsets are not required.

6. The method of claim 5, wherein the voice activity detection aids in acquisition and release of the floor of the PTT session.

7. The method of claim 5, wherein the voice activity detection is based on detecting a level of voice activity from the initiator or other participants.

8. The method of claim 5, wherein the other participants comprise one or more contacts, one or more groups of contacts, or a subset of a group of contacts.

* * * * *